350-171 CROSS REFERENCE SEARCH ROOM

88/24

X 2545

Aug. 28, 1956 G. W. KING 2,760,404

PHOTOGRAPHIC MEMORY

Filed Dec. 31, 1953

INVENTOR.
GILBERT W. KING
BY Lyon & Lyon
ATTORNEYS

United States Patent Office 2,760,404 Patented Aug. 28, 1956

2,760,404

PHOTOGRAPHIC MEMORY

Gilbert W. King, Pacific Palisades, Calif., assignor to International Telemeter Corporation, Los Angeles, Calif., a corporation of Delaware Application December 31, 1953, Serial No. 401,570

11 Claims. (Cl. 88—24)

This invention relates to memory devices used in information-handling machines and the like, and, more particularly, to an improved photographic memory.

The information-handling field has expanded tremendously in recent times. Examination of the systems used for the purpose of information handling reveals that they usually employ what can be called a permanent memory, such as magnetic tape, and temporary memories or stores, such as magnetic drums, electrostatic memories, magnetic cores, and the like. The permanent memory is used for the storage of information which does not change or which changes infrequently, at most. This information can be, for example, type of stock carried, names and addresses of customers or depositors, and the like. For effective operation, a permanent store or memory should permit the recording therein of a maximum of information with a minimum of space being required, fairly ready access to the information recorded, and ease in the readout thereof. For the permanent memory, there is no need for, and, in fact, there is a disadvantage in, the use of the easily erasable magnetic medium.

An object of this invention is to provide an improved permanent store which permits the storage of more information without increasing the space required for storage.

A further object of the present invention is to provide a permanent store which enables ready access to the information recorded therein.

Extensive work has been done with the recording of information on photographic film. Some of the latest work may be found in progress report No. 1 by R. D. O'Neal and A. W. Tyler of the Eastman Kodak Company, which is dated June 7, 1948, and entitled Photographic Digital Reader-Recorder. In this report there is described a memory system in which strip film is exposed to obtain black and white areas representative of binary coded information. The film is run past a reading station consisting of a light source and photocells in order to read the stored information. With this system, only one binary digit or bit is stored in a given area.

Another object of the present invention is to increase the number of digits which can be stored in a given area.

Still a further object of the present invention is to employ photographic techniques for information storage which provide recording of digital coded information in color.

These and further objects of the invention are obtained by employing as a recording medium a photographic emulsion on which it is possible to record in one and the same area marks in several different and distinct colors. This emulsion may be used in the form of either a disc, drum, or strip film. It has given discrete areas of different colors, each of which is representative of a different digit in a digital code. The color, of course, is dictated by the intelligence desired to be recorded. Thus, in one spot, a number of colors may be recorded representative of different binary digits or a single coded word or a decimal digit. The number of colors which may be used is limited by the orthogonality of the colors and means employed on readout or the ability to distinguish between the stored colors when reading of the information stored in the spot is desired. Reading is performed by illuminating a recorded spot with white light and using beam splitters plus filters or dichroic mirrors to separate, into its basic colors, the light which comes through the spot being illuminated. Photocells are then used to provide electrical signals representative of the digital code stored in a spot.

The novel features that are considered characteristic of this invention are set forth with particularity in the appended claims. The invention, itself, both as to its organization and method of operation, as well as additional objects and advantages thereof, will best be understood from the following description when read in connection with the accompanying drawings in which:

Figure 1:
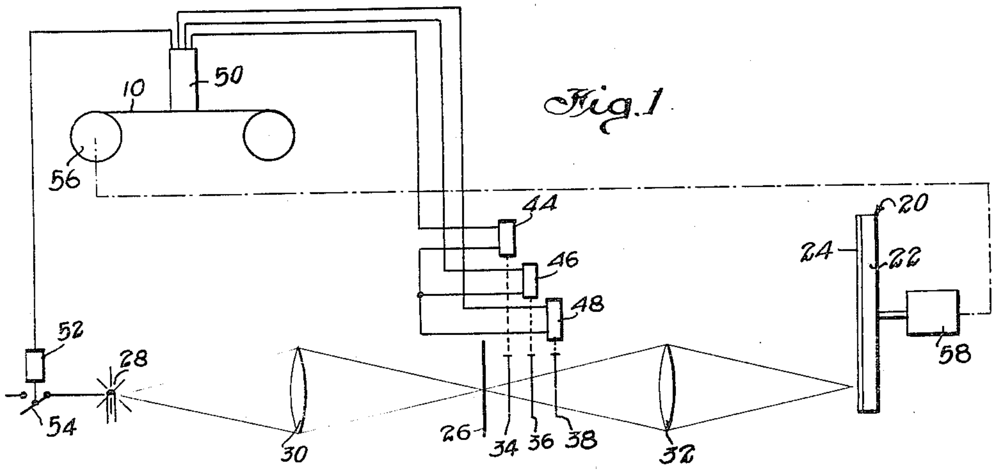
Figure 1 is a schematic diagram of an embodiment of the invention showing a system for recording on a disc of colored film employed as a memory herein.
Figure 2:
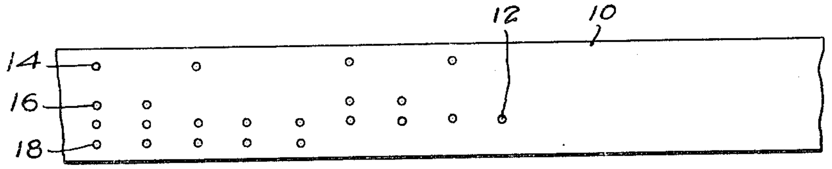
Figure 2 shows a strip of paper tape perforated in accordance with the binary code employed.

Referring now to Figures 1 and 2, there may be seen, by way of example, a representation of a recording medium, such as paper tape 10, upon which has been recorded information in digital code. The tape has perforations or sprocket holes 12 along its length so that it can be moved. These may be used for timing purposes, if desired. Let it be assumed that the paper tape has three columns or information tracks 14, 16, 18, across the width of tape. Let it be further assumed that the presence of a perforation in any information track represents a "1" and the absence of a perforation represents a "0." Then, as shown in the following table, an octal digital code may be employed with perforations in the tape associated with each one of the digits, as shown in Table I below:

*Table I*

| Octal Digit | Punching on Tape | | |
|---|---|---|---|
| | Track 1 | Track 2 | Track 3 |
| 0 | 0 | 0 | 0 |
| 1 | 1 | 0 | 0 |
| 2 | 0 | 1 | 0 |
| 3 | 1 | 1 | 0 |
| 4 | 0 | 0 | 1 |
| 5 | 1 | 0 | 1 |
| 6 | 0 | 1 | 1 |
| 7 | 1 | 1 | 1 |

Referring now to Figure 1, a photographic memory is represented by a disc 20 consisting of a translucent carrier 22 and a coating of an emulsion 24 which is capable of reproducing the colors to which it is exposed. This, for example, may be a 3-color film commercially sold under the name of Kodachrome by the Eastman Kodak Company. Marks are made on the disc by projecting an image of some suitable design on the disc. The design is produced by making a hole, square or rectangular or any other desired shape, in a mask 26, illuminated from a source of white light 28. By means of the focusing lenses 30, 32, the image of the hole is made on the disc. Between the source of illumination and the disc, provision is made for inserting one, two, three, or none of the three filters 34, 36, 38. In Figure 1, these filters are shown between the mask 26 and the lens 32. The three filters 34, 36, 38, respectively, have the following colors: blue-green, magenta, and yellow.

The insertion and withdrawal of the filters from between the light source and the disc is performed by means of solenoids 44, 46, 48, which are controlled by a transducer 50. The transducer senses the perforations in the tape. The presence of a perforation in a track causes the transducer to energize the solenoid associated with that track, which thereby withdraws the filter, to which the solenoid armature is coupled, from between the light source and the memory disc. The transducer 50 also senses the sprocket holes which provide current to energize a light control solenoid 52. This serves to operate a switch 54 at a time slightly after the filter controlling solenoids are operated, so that power from a source (not shown) energizes the light 28 whenever a digit is sensed by the transducer.

Assuming a correspondence of filters to tape perforations as shown in Table II, the color recorded on the photographic disc is also as shown in Table II.

*Table II*

| Octal Digit | Punching on Tape | | | Filters in Light Beam | | | Color Recorded on Photographic Memory |
|---|---|---|---|---|---|---|---|
| | Track 1 | Track 2 | Track 3 | Blue-Green | Magenta | Yellow | |
| 0 | 0 | 0 | 0 | in | in | in | black. |
| 1 | 1 | 0 | 0 | out | in | in | red. |
| 2 | 0 | 1 | 0 | in | out | in | green. |
| 3 | 1 | 1 | 0 | out | out | in | red and green. |
| 4 | 0 | 0 | 1 | in | in | out | blue. |
| 5 | 1 | 0 | 1 | out | in | out | red and blue. |
| 6 | 0 | 1 | 1 | in | out | out | blue and green. |
| 7 | 1 | 1 | 1 | out | out | out | white. |

The transducer or perforation senser, as well as the solenoids, are commercially available items. The tape is moved by its drive 56 and the disc is rotated synchronously therewith by its drive 58, so that for each digit being sensed a new, discrete area is presented for exposure at the proper position, which may be termed an exposure station. In operation, if the number sensed by the transducer is 011 (6), then the magenta and yellow filters are moved out of the light path, the blue-green filter remaining. Then the light source is energized, and blue-green light falls on the memory disc and is recorded there. Then the memory is turned so that a new, discrete area is provided for exposure. The solenoids are released and all the filters lie in the light beam. The next digit appears on the tape and is read by the tranducer. The filters are then removed by the solenoids (if necessary) to provide the next filter color associated with the digit being read. The flashlight is again flashed to record this next digit. Thus, the information on the tape may be recorded in color on the photographic memory. The information may be recorded in tracks concentrically disposed around the disc, or, if desired, in radial fashion, or even in the form of a helical track. These various configurations may be obtained as desired by either moving the disc or by using a scanning light source, such as a flying-spot scanner, whose deflection is controlled as desired and whose illumination may be controlled by the filters.

Regardless of the means for illuminating or laying down the pattern for the storage of information on the photographic disc, it should be appreciated that it has been shown how to store in one discrete area or spot on photographic film a plurality of binary digits or any one of the octal digits from "0" to "7" where heretofore it was only possible to store in one spot only one binary digit, either a "0" or a "1." Thus, with an emulsion sensitive to three colors, the capacity of the store is increased by a factor of three, when measured in bits, even though there is no increase in the packing density. It is also possible to use four colors photographically in which the dyes of four distinctive colors, such as red, yellow, green, and blue, can be recorded in the emulsion.

Complementary colored filters are also available. Storage is now provided which increases that of previous photographic systems by a factor of four without increasing the density of packing. Although the memory is described as a disc, it will be appreciated that it may have any other desired form. The single light source and the plurality of filters through which it illuminates the memory for exposure may be likened to a plurality of different colored light sources which are selectively illuminated in accordance with the binary number desired to be recorded.

Figure 3:
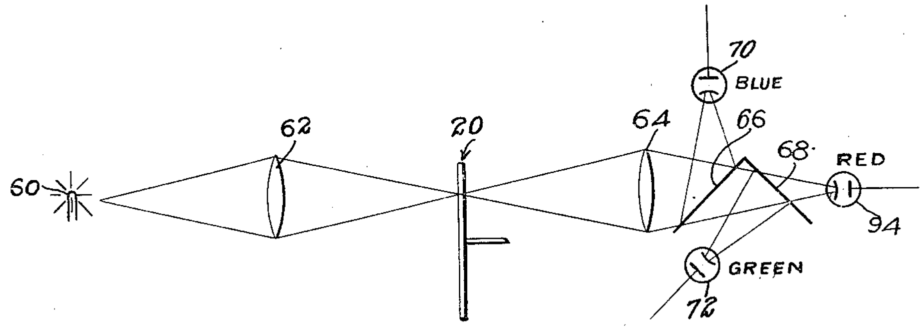
Figure 3 shows a system for reading out the information which is recorded on the photographic memory.

Reference is now made to Figure 3, where there is shown a preferred embodiment of a system for reading from the photographic memory. A source of substantially white light 60 has its light directed through a lens 62 to be focused upon the information track on the memory disc 20. The light passing through the disc is focused by another lens 64 on two dichroic mirrors 66, 68. One of the mirrors 66 reflects the blue light to a first photocell 70 and permits the red light to pass through. A second dichroic mirror 68 in the path of the light coming from the first dichroic mirror will pass the red light to a third photocell 74 and will reflect the green light to a second photocell 72. If reference is made to Table II shown below, it will be seen how the presence or absence of the photocell outputs will readily represent the digital information initially on the tape which was recorded from the tape onto the photographic memory disc. It will be appreciated that beam-splitting lenses plus filters may be used in place of the dichroic mirrors. Of course, where four colors or more are employed in the disc, more than one photocell is used in the manner taught in Figure 3.

*Table III*

| Color Recorded on Photographic Memory | Output of Photocell Sensitive to— | | | Octal Number Readout |
|---|---|---|---|---|
| | Red | Green | Blue | |
| Black | 0 | 0 | 0 | 0 |
| Red | 1 | 0 | 0 | 1 |
| Green | 0 | 1 | 0 | 2 |
| Red and green | 1 | 1 | 0 | 3 |
| Blue | 0 | 0 | 1 | 4 |
| Red and blue | 1 | 0 | 1 | 5 |
| Blue and green | 0 | 1 | 1 | 6 |
| White | 1 | 1 | 1 | 7 |

Another method of recording the information on the photographic memory which can employ the simple silver halide emulsion without the complicated and expensive structure of color film is as follows. A starting position is indexed on the disc so that it can be very readily found. Then the power to the driving motor is shut off so that the disc remains stationary. By reference to Table II shown previously, it will be seen that in the first track of the tape a binary digit "1" appears only when the color red is required. Similarly, the second track provides a binary digit "1" when the color green is required, and the third track provides a binary digit "1" when the color blue is required. Then the reading head has two of its outputs disconnected so that it provides an output from only the information in the first track. The output lead representative of an output from that first track is connected directly to the circuit operating the source of light, or to a shutter. The source of light may have any chromaticity to which the emulsion is sensitive. The memory disc is synchronized to move with the drive on the tape. Accordingly, discrete areas of the disc are moved past the exposure station simultaneously with perforations on the tape being moved past the reading head. As a hole appears in track 1 on the tape, the decoder will provide a signal to the flashlight control to cause it to illuminate the exposure station. When a length of tape desired to be recorded is ended, the tape is rewound to the starting point. The memory disc is developed by a technique in which the exposed silver therein is replaced by a red dye. The emulsion is then rehalogenated by a method well known in the photographic art, so that it is now uniformly sensitive to light (even in the areas already exposed and colored red). The starting position of the memory disc is again found. This time, however, the reading head is altered to provide an output for perforations found in the second track. The output of the second track reading ahead of the transducer is now connected to the solenoid which supplies the power to the light source (or to the shutter). The tape and the disc are again rotated synchronously, and it will be seen that every time a hole occurs in the second track the discrete area passing through the exposure station is exposed. At the conclusion of the entire tape length which is being recorded, the memory wheel is again developed in the manner recited above. However, the exposed silver in this instance is replaced by a green dye. The previous procedures are again repeated with the third track of the tape, and this time the development replaces the exposed silver with a blue dye. This procedure permits the employment of an ordinary type of emulsion for the memory.

There has been described and shown hereinabove a novel and useful photographic memory which permits the employment of photographic techniques to increase the memory stored on the disc without increasing the packing factor. Although the description herein has been made in connection with recording information from a source which was perforated tape, this should not be construed as a limitation, since coded information from any other source or recording medium may be recorded on discrete areas of the photographic memory. Furthemore, the photographic memory need not be a disc but may be a drum, a sheet, or even strip film on a reel.

I claim:

1. A photographic memory system comprising a photographic emulsion of the type capable of reproducing colors to which it is exposed, a carrier for said emulsion, means to expose discrete areas of said emulsion to different colors representative of digital coded information, means to illuminate each of said discrete areas, and means responsive to the illumination received from a discrete area to provide electrical signals representative of the digital coded information recorded in said area.

2. A photographic memory system comprising a photographic emulsion of the type capable of reproducing the colors to which it is exposed, a carrier for said emulsion, means to expose discrete areas of said emulsion to different colors representative of digital coded information, means to illuminate each of said discrete areas, means to separate the illumination received from each of said discrete areas into the different colors registered thereon, and photoelectric means responsive to the different colors to provide electrical signals representative of said digital coded information.

3. A system for recording coded digital information in color comprising in combination, a recording medium on which said digital information is recorded, means to read each digit of said recorded information, a plurality of sources of differently colored illumination, each source being associated with a different digit in said code, a photographic emulsion of the type capable of reproducing the colors to which it is exposed, a carrier for said emulsion, and means responsive to the digit read by said means to read to expose different discrete areas of said emulsion to an associated one of said sources of illumination.

4. A system for recording coded digital information in color from a system including a recording medium on which said digital information is recorded, and including means to read said digital information, said system comprising a photographic emulsion of the type capable of assuming the colors to which it is exposed, a carrier for said emulsion, a plurality of sources of differently colored illumination, each source being associated with a different digit in said digital code, an exposing station, means to move different discrete areas of said emulsion past said exposing station, and means responsive to a digit being read by said reading means to illuminate said emulsion at said exposing station with the associated source of colored illumination.

5. A system for recording coded digital information in color from a system including a recording medium on which said digital information is recorded, and including means to read said digital information, said system comprising a photographic emulsion of the type capable of reproducing the colors to which it is exposed, a carrier for said emulsion, a source of substantially white illumination, a plurality of differently colored light filters, said filters being associated with different digits in said code, an exposing station upon which said source of illumination is directed, means to move different discrete areas of said emulsion past said exposing station, and means responsive to a digit being read by said reading means to interpose said light filters associated with the digit read between said source of illumination and said exposing station.

6. A system for recording as recited in claim 5 wherein said means to interpose an associated one of said light filters between said source of illumination and said exposing station includes a plurality of solenoids each having its armature attached to a different filter, and means to position said solenoids to interpose all said filters between said light source and said emulsion when all said solenoids are not excited.

7. A system for recording coded digital information from a source of said information comprising a plurality of sources of differently colored illumination, each source being associated with a different digit of said code, a photographic emulsion of the type capable of reproducing the colors to which it is exposed, a carrier for said emulsion, an exposing station illuminated by one of said plurality of sources, means to move different discrete areas of said emulsion past said exposing station, and means to determine the one of said plurality of different sources illuminating said exposing station responsive to the application of a digit of said code from said source.

8. A system for recording coded digital information from a source of said information comprising a photographic emulsion of the type capable of reproducing the colors to which it is exposed, a carrier for said emulsion, a plurality of differently colored light filters, each of said filters being associated with a different one of the digits in said code, a rotatable hub, means to support said filters in a plane disposed around said hub and to be rotated therewith, a source of substantially white light, an exposing station upon which the light from said light source is directed, means to move different discrete areas of said emulsion past said exposing station, means to position said hub to interpose one of said filters between said source of white light and said exposing station, and means responsive to a digit from said source to rotate said hub to position the one of said filters associated with said digit between said light source and said exposing station.

9. A photographic memory comprising a rotatable translucent disc having a photographic emulsion attached in which coded digital information is recorded in discrete areas of said emulsion as different colors, each of said different colors being representative of a different digit in said code, means for illuminating a discrete area of said disc, means for moving said disc to move discrete areas past said means to illuminate, and means responsive to the illumination from said discrete areas to provide electrical signals representative of the digits represented by the color in each of said discrete areas.

10. A photographic memory comprising a rotatable translucent drum having a photographic emulsion attached wherein coded cigital information is recorded in discrete areas of said emulsion as different colors, each of said different colors being representative of a different digit in said code, means for illuminating a discrete area of said disc, means for moving said disc to move discrete areas past said means to illuminate, and means responsive to the illumination from said discrete areas to provide electrical signals representative of the digits represented by the color in each of said discrete areas.

11. A method of recording coded digital information in color on a photographic emulsion from a system including a recording medium in which said digital information is recorded and wherein a different digit in said code is to be identified with a different color, said method comprising the steps of moving different discrete areas of said photographic emulsion from a starting position past an exposing station synchronously with the readout of digital information from said recording medium, illuminating said exposing station when a first identified digit is read out, developing said photographic emulsion in a manner to produce a first distinct color, rehalogenating said photographic emulsion, again moving different discrete areas of said photographic emulsion from said starting position past said exposing station synchronously with the readout again of the digital information previously read out, illuminating said exposing station when a second identified digit is read out, developing said photographic emulsion in a manner to produce a second distinct color, rehalogenating said photographic emulsion, and repeating said moving, illuminating, developing and rehalogenating steps until said emulsion has had all of the different colors developed thereon and said digital information is recorded on said photographic emulsion.

References Cited in the file of this patent

UNITED STATES PATENTS

| | | |
|---|---|---|
| 1,390,983 | Comstock | Sept. 20, 1921 |
| 2,196,166 | Bryce | Apr. 2, 1940 |
| 2,446,200 | Tait | Aug. 3, 1948 |
| 2,641,976 | Bryce | June 16, 1953 |
| 2,645,169 | Hayward | July 14, 1953 |